US006583732B1

(12) United States Patent
Bervoets et al.

(10) Patent No.: US 6,583,732 B1
(45) Date of Patent: Jun. 24, 2003

(54) SYSTEM FOR DATA TRANSFER BETWEEN MOVING OBJECTS AND FIXED STATIONS

(75) Inventors: Alfonsus Maria Bervoets, Bentveld (NL); Franciscus Robertus Albertus Cornelis Hin, Neerpelt (BE)

(73) Assignee: AMB IT-Holding B.V., Heemstede (NL)

( * ) Notice: Subject to any disclaimer, the term of this patent is extended or adjusted under 35 U.S.C. 154(b) by 0 days.

(21) Appl. No.: 09/913,191

(22) PCT Filed: Feb. 11, 2000

(86) PCT No.: PCT/NL00/00086

§ 371 (c)(1),
(2), (4) Date: Dec. 17, 2000

(87) PCT Pub. No.: WO00/48132

PCT Pub. Date: Aug. 17, 2000

(30) Foreign Application Priority Data

Feb. 12, 1999 (NL) ............................................. 1011298

(51) Int. Cl.[7] ................................................. G08G 1/01
(52) U.S. Cl. ........................ 340/933; 340/904; 340/928
(58) Field of Search ................................ 340/928, 907, 340/933, 937, 942, 961, 906, 904; 701/115, 117, 2; 455/422, 456, 524; 342/457, 417

(56) References Cited

U.S. PATENT DOCUMENTS

| | | | | |
|---|---|---|---|---|
| 4,182,989 A | * | 1/1980 | Endo et al. | ................... 340/933 |
| 4,338,587 A | | 7/1982 | Chiappetti | |
| 4,339,753 A | | 7/1982 | Mawhinney | |
| 5,058,201 A | * | 10/1991 | Ishii et al. | .................... 455/422 |
| 5,347,274 A | | 9/1994 | Hassett | |
| 5,986,575 A | * | 11/1999 | Jones et al. | ................... 340/906 |
| 6,049,295 A | * | 4/2000 | Sato | ............................ 340/928 |
| 6,127,975 A | * | 10/2000 | Maloney | ..................... 342/457 |

FOREIGN PATENT DOCUMENTS

| | | |
|---|---|---|
| DE | 43 40 148 A1 | 6/1995 |
| DE | 44 27 549 A1 | 2/1996 |
| EP | 0 577 328 A2 | 1/1994 |
| FR | 2 609 812 A | 7/1988 |
| WO | WO 91/20067 A1 | 12/1991 |

* cited by examiner

*Primary Examiner*—Van Trieu
(74) *Attorney, Agent, or Firm*—Browdy and Neimark, P.L.L.C.

(57) ABSTRACT

System for data transfer between one or more objects moving along a path and one or more fixed communication stations located along said path, wherein each object is provided with a transmitter/receiver combination, the transmitter of which is coupled to an identity code generator and the receiver of which is coupled to a data processing unit, and wherein each communication station is provided with a transmitter/receiver combination, the transmitter of which is coupled to a message generator and the receiver of which is coupled to an identity code recognition unit, wherein the transmitter/receiver of each object is continually activated, at least in the vicinity of the communication station, such that successively, in an alternating series of first and second periods, the transmitter transmits an identity code, originating from the identity code generator, in a first period and the receiver is ready to receive any responses in a second period, wherein, furthermore, the receiver of each station is continually activated until an identity code has been received, which code is recognized by the recognition unit, after which the message generator and the transmitter are activated in order to transmit any message intended for the object having this code.

11 Claims, 3 Drawing Sheets

SYSTEM FOR DATA TRANSFER BETWEEN MOVING OBJECTS AND FIXED STATIONS

REFERENCE TO RELATED APPLICATIONS

The present application is the national stage under 35 U.S.C. 371 of international application PCT/NL00/00086, filed Feb. 11, 2000 which designated the United States, and which international application was published under PCT Article 21(2) in the English language.

BACKGROUND OF THE INVENTION

The invention relates to a system for effecting data transfer between one or more objects moving along a path and one or more fixed communication stations located along said path.

Such systems are already known per se, for example from U.S. Pat. No. 5,406,275, U.S. Pat. No. 5,347,274, U.S. Pat. No. 4,501,958 and DE 4,331,286.

U.S. Pat. No. 5,406,275 describes a system that is essentially intended for detecting vehicles for the purposes of levying a toll on these vehicles as a fee for use of specific road sections. The road sections which are subject to payment of a toll are marked by communication stations which recognise passing vehicles on the basis of the identity codes transmitted by these vehicles. If the vehicles have been recognised the toll can then be levied in some way or other.

U.S. Pat. No. 5,347,274 describes a system for monitoring special transports, for example transports of chemical waste or the like. To this end communication stations are installed along the routes which the vehicles concerned have to follow. When a vehicle passes by, in any event the identity code of the vehicle is recognised in the station and it is thus established that the vehicle concerned has passed this station. In this way a vehicle can be followed and monitored over its entire route.

U.S. Pat. No. 4,501,958 describes a system that is intended for levying a toll on vehicles which make use of specific road sections. Here also identity codes are exchanged between the moving object and the fixed communication stations in order to be able to recognise the vehicles on the basis of these identity codes and to be able to levy the toll.

In all known systems a distinction is made between periods in which the distance between a moving object and a communication station is too great to be able to effect data transfer and a period in which the moving object is in the immediate vicinity of a communication station and data transfer could therefore be effected. In the first-mentioned period the transmitter/receiver combination of the object is activated in such a way that the transmitter is switched off, whilst the receiver is listening continually and waiting for receipt of an activation signal. Furthermore, the transmitter/receiver combinations of the communication stations are activated during these periods in such a way that the receiver is switched off while the transmitter is transmitting an activation signal at intervals. If one of the moving objects now comes within the range of a communication station, the receiver of this object will receive the activation signal from the station. The receiver will activate the associated transmitter, which will then transmit the identity code, stored in the identity code generator. The receiver in the station, which waits for any responses after every transmission of an activation signal, will receive this identity code and transmit it to the code recognition unit. If the code is recognised in this recognition unit, a message generator can then be activated in order to establish whether this generator contains a message intended for the object associated with this code. If this is the case, this message will then be transmitted, modulated to the activation signal or added thereto, to the moving object, where this message is received and fed to the data processing unit.

In all these known systems it is thus assumed that the moving object is in fact passive as long as no data transfer can be effected and that the fixed communication stations are continually transmitting activation signals. The Applicant has recognised that this is in fact a time-consuming system. This can lead to serious disadvantages if there is only a very limited time available for effecting the data transfer.

If the objects are, for example, moving at a speed of 360 km/h=100 m per second and if the antennas of the fixed communication stations consist of loops installed in the road surface, there being a possibility for data transfer only if the vehicle is located within a strip of, for example, 1 m, measured in the direction of movement, then there is only 1/100 second in which to effect a complete data transfer.

It has now been found that a significant gain in time can be achieved if, in contrast to all known systems, the transmitter/receiver combinations of each moving object are continually active, at least in the vicinity of the stations, and transmit their identity codes at intervals, whilst the transmitter/receiver combinations of the stations are continually set to passive mode, that is to say the transmitters are switched off and the receivers wait until they receive an identification

SUMMARY OF THE INVENTION

In this context the invention now provides a system for effecting data transfer between one or more objects moving along a path and one or more fixed communication stations located along said path, characterised in that each object is provided with a transmitter that is coupled to an identity code generator, and in that each communication station is provided with a receiver that is coupled to an identity code recognition unit, wherein the transmitter of each object is continually activated, at least in the vicinity of a communication station, such that, in an alternating series of first and second periods, the transmitter successively transmits an identity code, originating from the identity code generator, in a first period and the transmitter transmits nothing in a second period, and wherein the receiver of each station is continually activated until an identity code is received, which code is recognised by the recognition unit.

With reference to the figures it will be explained below that a significant gain in time compared with systems according to the prior art can be achieved with this system.

In many cases the transfer of an identification code only is found to be too restricted and there is a desire to be able to transfer more data.

A preferred embodiment of the system meets this requirement. This embodiment is characterised in that each object is provided with a message generator and in that each station is provided with a message receiver, wherein the message, always in series with the identity code, is transmitted by the transmitter of the object, and in that, in the station, which has first received the identity code, the message which follows it is passed to the message receiver and stored. In this way it is possible to transfer more data than merely the identification code between an object and a station.

A limitation to which both the embodiments described above are subject is based on the fact that transmission is possible only from an object to a station and not in the opposite direction.

An embodiment with which bidirectional transmission is possible is characterised in that, in addition to the transmitter, each object is provided with a receiver that is coupled to a message receiver, and in that, in addition to the receiver, each communication station is provided with a transmitter that is coupled to a message generator, wherein, after an identity code has been received in a communication station and has been recognised by the recognition unit, the message generator and the transmitter are activated in order to transmit any message intended for the object concerned and wherein the receiver of each object is ready in each second period to receive any responses and pass these to the message receiver.

Bidirectional traffic is possible with this embodiment. A disadvantage is still lurking in the fact that less time is available for transmission of a message from object to station than in the opposite direction because some of the available time has to be used for transfer of the identification code.

An embodiment that does not have this disadvantage is characterised in that each object is provided with a message generator coupled to the transmitter and in that each communication station is provided with a message processing unit coupled to the receiver, wherein, after the message receiver in the object has received, or after a predetermined waiting period following the transmission of the identification code, the transmitter and the message generator in the object are activated in order to transmit any message and the receiver in the station, after transmitting a message to the object, or after receipt of the identification code, waits for any message from the object.

Further embodiments and further details of the system according to the invention will be explained below with reference to the appended figures.

DETAILED DESCRIPTION OF THE INVENTION

Figure 1:
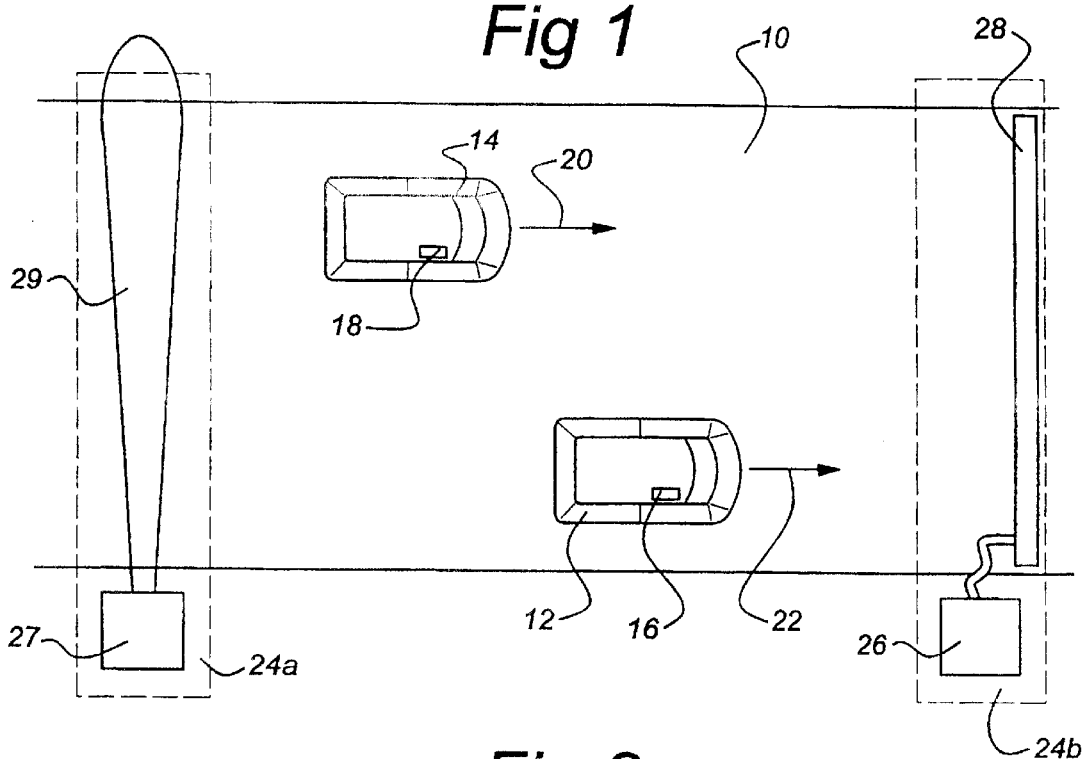
FIG. 1 shows, diagrammatically, a number of moving objects, constructed as vehicles, in the vicinity of a few communication stations.

FIG. 1 shows part of a path 10 along which two vehicles 12 and 14 are moving. Vehicle 12 is moving in the direction of the arrow 22 and vehicle 14 is moving in the direction of the arrow 20. Both vehicles are provided with a transmitter/receiver combination, indicated by 16 for vehicle 12 and by 18 for vehicle 14.

A number of communication stations, such as the communication stations 24a and 24b which can be seen in FIG. 1, have been installed along the path 10. Station 24a is intended for RF transmission and is provided with a transmitter/receiver 27 which transmits and receives signals via an antenna with a very narrow beam as is illustrated diagrammatically by 29. Station 24b consists of a wire loop 28, which is installed in the road surface and serves as a bidirectional antenna, and the associated transmitter/receiver combination, indicated by 26. The actual transmission medium and the transmission process employed are not essential within the framework of the invention. It is possible to use RF radio transmission, as in station 24a, transmission via electromagnetic detection loops, as in station 24b, but also optical transmission via, for example, IR transmitters and receivers or any other forms of transmission. Moreover, in the embodiments with bidirectional communication, which are still to be described below, it is also not necessary that the same transmission medium is used for both directions.

As soon as one of the vehicles 12 or 14 is a short distance away from a station data transfer can take place between the vehicle concerned and the communication station. This will be explained in more detail below.

Figure 2:
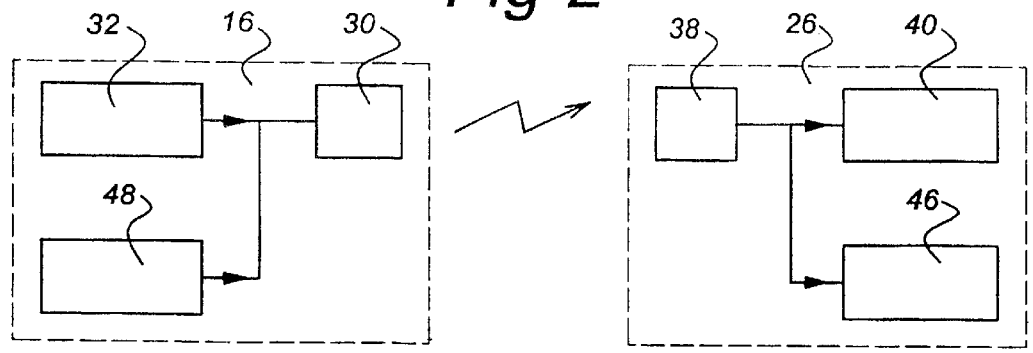
FIG. 2 shows, diagrammatically, a block diagram of the requisite hardware in a very simple embodiment of the system, both in each vehicle and in the communication stations.

First of all the requisite hardware for a very simple embodiment of the system is discussed in FIG. 2. In this system each vehicle is provided with a unit 16 comprising a transmitter 30 and an identity code generator 32 coupled thereto. Each station is provided with a unit 26 comprising at least a receiver 38 and a code recognition unit 40. Communication can take place as soon as the distance between a vehicle and a station is within the range of the transmitter 30. During operation of the system the transmitter 30 is continually activated in such a way that said transmitter 30 always transmits an identity code supplied by the generator 32 during a first period and then does not transmit during a second period. The receiver 38 is continually activated and, as soon as the object 16 concerned comes close enough, will receive the identity code transmitted by the transmitter 30. The received code is passed from the receiver 38 to a code recognition unit 40 which is able to recognise this code, for example on the basis of a number of possible codes stored in a memory. Data transfer in this very simple system thus consists solely in the transfer of an identity code by means of which it can be established in each station in turn, that is passed by a vehicle, that the vehicle is indeed passing by. In many cases, however, the possibilities of such a simple embodiment will be too restricted.

The system offers more possibilities if, as is illustrated in FIG. 2, each object is provided with a message generator 48 and each station is provided with a message receiver 46. In this embodiment the system can function in such a way that, as well as the identity code, received from the generator 32, the transmitter 30 then also transmits the message, originating from the message generator 48, as a single data stream. The receiver in the station 38 will then first receive a code fragment and then a series of bits representing the message. The code is passed to the recognition unit 40 and the message fragment passes directly into the message receiver 46.

Figure 3:
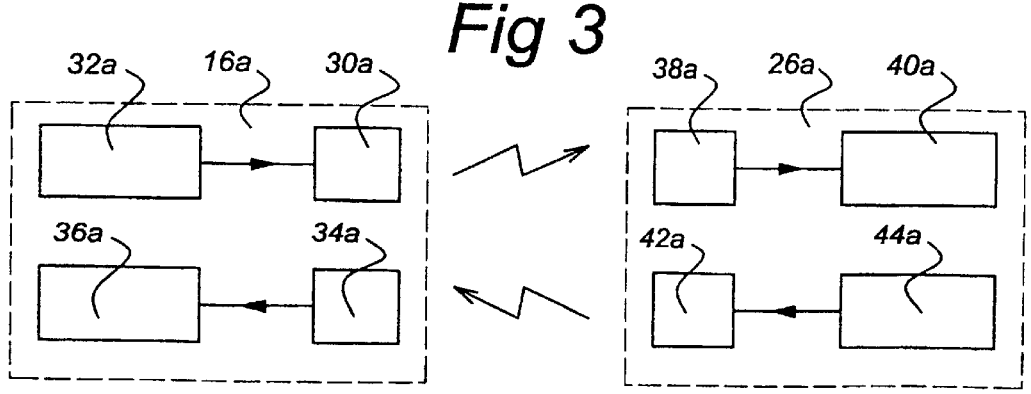
FIG. 3 shows, diagrammatically, a further developed embodiment of the system with which bidirectional communication can be effected.

The two relatively simple systems discussed above allow communication in one direction only. If this is found to be too restricted, use can then be made of a further developed embodiment, a diagrammatic illustrative embodiment of which is shown in FIG. 3. In this illustrative embodiment the unit 16a which is present in a vehicle contains a transmitter 30a with an identity code generator coupled thereto, as well as a receiver 34a with a message receiver 36a coupled thereto. Furthermore, the stations are provided with units 26a, each provided with a receiver 38a coupled to a code recognition unit 40a and a transmitter 42a coupled to a message generator 44a. In this system as well, the transmitter 30a is active in such a way that it continually transmits the code, which is supplied by the generator 32a, in a first period, whilst nothing is transmitted during a subsequent second period. The receiver 34a can optionally receive signals in this second period.

As soon as the vehicle and the station come within one another's range, the identity code transmitted by the transmitter 30a is received by the receiver 38a and fed to the recognition unit 40a. The latter recognises the code and if the message generator 44a contains a message for the vehicle having this code said generator 44a and the transmitter 42a coupled thereto are then activated to transmit this message. This takes place after the transmitter 30a has stopped transmitting. The message is therefore transmitted during the said second period and received by the receiver 34a and stored in a message receiver 36a.

The mode of operation of the embodiments discussed up to now can be explained in more detail with reference to the time diagrams in FIG. 5.

Figure 5A:
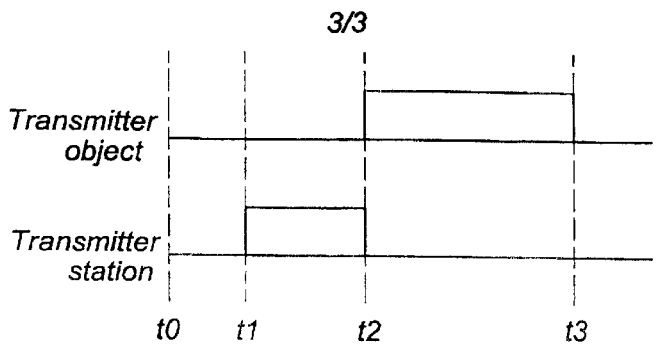
FIG. 5 shows a number of time diagrams to explain how the various embodiments of the system function.
Figure 5B:
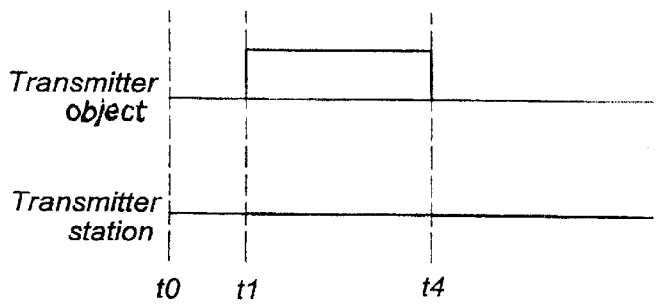
Figure 5C:
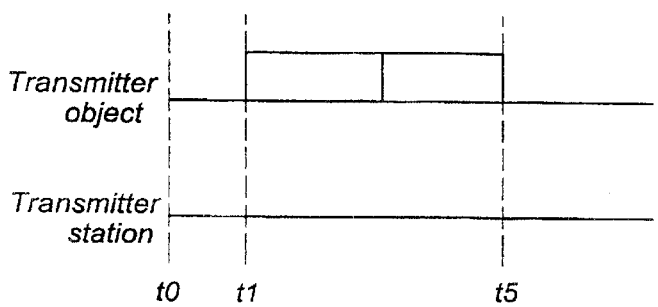

First of all a system known in its entirety from the prior art is discussed with reference to FIG. 5a. As has already been pointed out in the above, in the systems according to the prior art it is assumed that the communication stations transmit a request signal continually (or at fixed intervals), whilst the transmitter/receiver combinations in the vehicles listen passively and wait until they receive a request signal.

Assume that at time t0 the vehicle has come so close to the station that data transfer is possible. Nothing will yet occur at time t0 as such. At a subsequent point in time t1 the station starts to transmit the request signal. This takes place in the period between t1 and t2. This request signal is received in the receiver in the vehicle and on the basis of this the transmitter in the vehicle is activated. This transmitter starts to transmit the identity code signal, received from the identity code generator, from time t2. This transmission period takes place between t2 and t3. The code signal is received in the receiver of the communication station and is passed to a code recognition generator which recognises the code and on the basis of this knows the identity of the vehicle.

The entire cycle thus takes up the period between t0 and t3.

According to the invention the stations 24 are passive and the transmitters in the vehicles are continually switched on in order to transmit the identification code (with pauses).

In the simplest embodiment of the system, illustrated in FIG. 2 and without the message generator 48 and the message receiver 46, the transmitter in the vehicle will be activated at time t1, as soon as the vehicle and the transmitter have come sufficiently close together at time t0, and will transmit the identity code between the times t1 and t4.

In the embodiment as shown in FIG. 2, that is to say including the message transmitter 48 and the message receiver 46, the transmitter will be activated at time t1 to transmit the identity code first of all, immediately followed by the transmission of the message originating from the generator 48. The entire transmission cycle is complete at time t5. Both time t4 and time t5 can easily be before time t3, by which means the envisaged gain in time is indeed achieved.

The mode of operation of the embodiment of the system as illustrated in FIG. 3 will be discussed with reference to FIG. 5d.

Figure 5D:
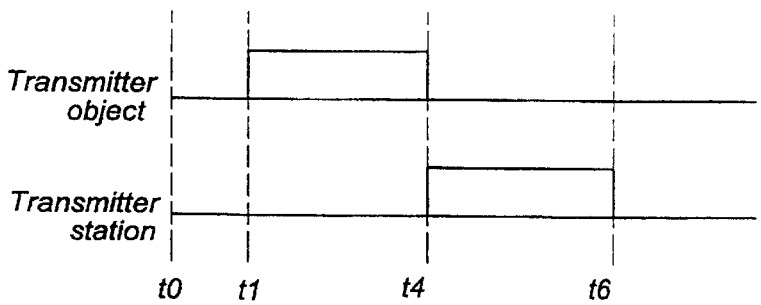

As is shown in FIG. 5d, the vehicle 12 is within the field of influence of the station 24 from time t0. The vehicle starts to transmit its identification code at time t1. This transmission period continues to time t2. Within this period the identification code is received by the receiver 38a of the station 26 and is transmitted to the code recognition unit 40a. The code recognition unit 40a recognises the code and activates the message generator 44a to determine whether there are messages for the vehicle 12. If this is the case the transmitter 42a will then be activated and will transmit the message in the period between t2 and t3. The message is received by the receiver 34a in the vehicle and is passed to a data processing unit in which the message is decoded and processed.

This entire procedure takes place in the period between t0 and t3 and it will thus be clear that a significant gain in time is achieved compared with the systems from the prior art.

Figure 4:
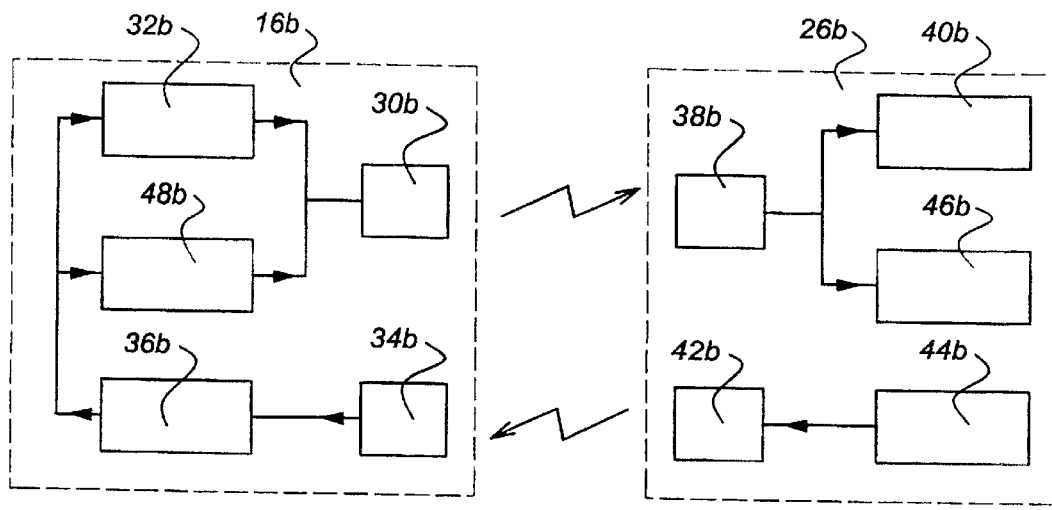
FIG. 4 shows, diagrammatically, a yet further developed embodiment of the system.
Figure 5E:
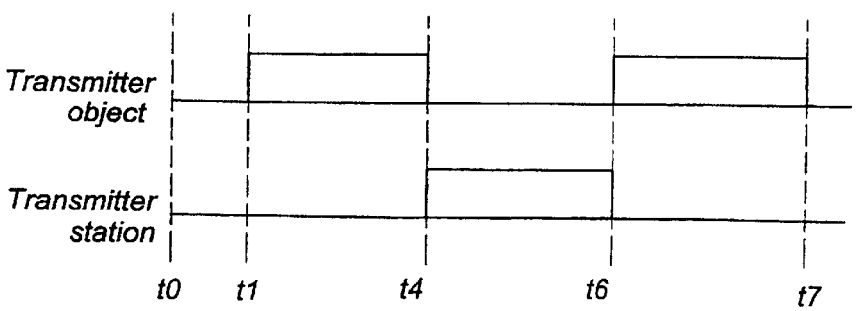

The mode of operation of a yet further expanded embodiment which is shown in FIG. 4 is illustrated in FIG. 5e. FIG. 5e differs from the diagram in FIG. 5d in that period t6–t7 is added. As soon as time t6 is reached the transmitter 42b in the station will be activated in order to transmit the message, originating from the generator 44b, in the direction of the vehicle. Time t6 is reached as soon as the transmitter 30b stops transmitting its message. If there was no message in the vehicle, the transmitter 42b can then also be activated after a predetermined period in which nothing is received. In any event the entire bidirectional process is ended at t7.

It will be clear that the bidirectional communication which actually takes place between the times t4 and t7 can optionally be repeated a number of times with further messages or parts of messages. This can continue as long as the vehicle and the station are within range of one another.

Figure 6:
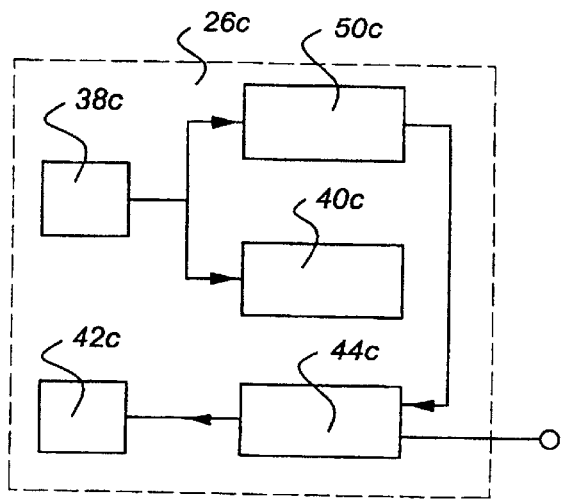
FIG. 6 shows an embodiment with additional facilities.

FIG. 6, finally, shows an embodiment of a communication station in which means are incorporated for measuring the signal strength with the ultimate aim of determining the speed of the vehicle. The station 26c is provided with a number of components which are now known, that is to say: the receiver 38c, the identification code recognition unit, the message generator 44c and the transmitter 42c. The mode of action of these known components requires no further explanation following the above.

A measurement and computation unit 50c is added in FIG. 6. First of all, during transmissions by the transmitter in a moving object which is within the range of the station 26c, the signal strength is measured in this unit. The measured values of the signal strength are temporarily stored, always in combination with the time at which the relevant signal strength was measured. The unit 50c contains a computing unit by means of which it is possible, on the basis of these stored values, to calculate the time at which the signal strength would have been maximum if the transmitter had transmitted continuously. This maximum time is stored. If the same object comes back into the vicinity of the station after covering the entire path this measurement is carried out again, resulting in a second maximum time. The computing unit in the unit 50c is now able to calculate the average speed at which the object moved between the two maximum times from the two times and from the length of the path, which is known per se.

By making a connection between the unit 50c and the message generator 44c, the calculated average speed can be incorporated in the next message to be transmitted. The object thus receives information on its speed.

What is claimed is:

1. System for effecting data transfer between one or more objects moving along a path and one or more fixed communication stations located along said path, characterised in that each object is provided with a transmitter that is coupled to an identity code generator, and in that each communication station is provided with a receiver that is coupled to an identity code recognition unit, wherein the transmitter of each object is continually activated, at least in the vicinity of a communication station, such that, in an alternating series of first and second periods, the transmitter successively transmits an identity code, originating from the identity code generator, in a first period and the transmitter transmits nothing in a second period, and wherein the receiver of each station is continually activated until an identity code is received, which code is recognised by the recognition unit.

2. System according to claim 1, characterised in that each object is provided with a message generator and in that each station is provided with a message receiver, wherein the message, always in series with the identity code, is transmitted by the transmitter of the object, and in that, in the station, which has first received the identity code, the message which follows it is passed to the message receiver and stored. (FIG. 2).

3. System according to claim 2, characterised in that the message receiver in each object is coupled to indication means and in that a message received via the receiver is processed to give signals for controlling said indication means.

4. System according to claim 1, characterised in that in addition to the transmitter, each object is provided with a receiver that is coupled to a message receiver, and in that, in addition to the receiver, each communication station is provided with a transmitter that is coupled to a message generator, wherein, after an identity code has been received in a communication station and has been recognised by the recognition unit, the message generator and the transmitter are activated in order to transmit any message intended for the object concerned and wherein the receiver of each object is ready in each second period to receive any responses and pass these to the message receiver. (FIG. 3).

5. System according to claim 4, characterised in that each object is provided with a message generator coupled to the transmitter and in that each communication station is provided with a message processing unit coupled to the receiver, wherein, after the message receiver in the object has received, or after a predetermined waiting period following the transmission of the identification code, the transmitter and the message generator in the object are activated in order to transmit any message and the receiver in the station, after transmitting a message to the object, or after receipt of the identification code, waits for any message from the object. (FIG. 4).

6. System according to one of the preceding claims, characterised in that different transmission media are used for transmission from an object to a station and for transmission from a station to an object.

7. System according to claim 1, characterised in that the receiver in at least one station is coupled to a signal strength meter, a signal rating unit and to a clock and in that the output signal from the signal strength meter is processed in the signal rating unit in order to determine the signal strength with the aim of determining the time at which the maximum would have occurred if the object were to transmit continuously.

8. System according to claim 7, characterised in that the said time is stored in a memory that in any event can contain two times.

9. System according to claim 8, characterised in that means are present for determining the difference between two successive times.

10. System according claim 9, wherein the path is a closed path, characterised in that means are present by means of which the average speed at which the path is covered is determined on the basis of the known length of the closed path and two times determined in succession.

11. System according claim 8, wherein the path is a closed path, characterised in that means are present by means of which the average speed at which the path is covered is determined on the basis of the known length of the closed path and two times determined in succession.

* * * * *